(12) United States Patent
Whinnett

(10) Patent No.: US 8,385,928 B2
(45) Date of Patent: Feb. 26, 2013

(54) COMMUNICATION NETWORK

(75) Inventor: Nick Whinnett, Wiltshire (GB)

(73) Assignee: Mindspeed Technologies U.K., Limited, Bath (GB)

( * ) Notice: Subject to any disclaimer, the term of this patent is extended or adjusted under 35 U.S.C. 154(b) by 425 days.

(21) Appl. No.: 12/538,311

(22) Filed: Aug. 10, 2009

(65) Prior Publication Data

US 2010/0035617 A1 Feb. 11, 2010

(30) Foreign Application Priority Data

Aug. 11, 2008 (GB) .................... 0814685.4

(51) Int. Cl.
*H04W 36/00* (2009.01)

(52) U.S. Cl. ....... 455/449; 455/443; 455/444; 455/63.1; 455/63.2

(58) Field of Classification Search ............ 455/444, 455/445, 422.1, 432.1, 448, 63.1, 63.2, 443, 455/449; 370/338
See application file for complete search history.

(56) References Cited

U.S. PATENT DOCUMENTS

| | | | | |
|---|---|---|---|---|
| 2009/0003263 A1* | 1/2009 | Foster et al. | ................. | 370/328 |
| 2009/0046665 A1* | 2/2009 | Robson et al. | ................. | 370/332 |
| 2009/0098871 A1* | 4/2009 | Gogic | ................. | 455/435.1 |
| 2009/0163216 A1* | 6/2009 | Hoang et al. | ................. | 455/450 |
| 2009/0196253 A1* | 8/2009 | Semper | ................. | 370/331 |
| 2009/0296635 A1* | 12/2009 | Hui et al. | ................. | 370/328 |
| 2010/0035556 A1* | 2/2010 | Cai et al. | ................. | 455/63.2 |
| 2010/0195525 A1* | 8/2010 | Eerolainen | ................. | 370/252 |
| 2011/0122834 A1* | 5/2011 | Walker et al. | ................. | 370/329 |
| 2011/0130143 A1* | 6/2011 | Mori et al. | ................. | 455/436 |

FOREIGN PATENT DOCUMENTS

| | | |
|---|---|---|
| WO | 2007/054127 A1 | 5/2007 |
| WO | 2008/099340 A1 | 8/2008 |

OTHER PUBLICATIONS

United Kingdom Search Report for GB0814685.4 dated Nov. 21, 2008.
United Kingdom Search Report for GB0814685.4 dated Jan. 23, 2012.

* cited by examiner

*Primary Examiner* — Jean Gelin
(74) *Attorney, Agent, or Firm* — Weide & Miller, Ltd.

(57) ABSTRACT

There is provided a method of operating a communication network comprising at least one macrocellular base station, and a plurality of femtocell base stations that are within the coverage area of the at least one macrocellular base station, the method comprising providing a proxy in a signalling path between the at least one macrocellular base station and the plurality of femtocell base stations, providing unidirectional signalling for the support of mobility and interference control from the at least one macrocellular base station to the proxy; and providing signalling for the support of mobility and interference control between the proxy and the plurality of femtocell base stations.

21 Claims, 2 Drawing Sheets

COMMUNICATION NETWORK

This application claims the benefit of priority application number 0814685.4 filed in Great Britain on Aug. 11, 2008. The subject matter of this application is incorporated herein by reference.

TECHNICAL FIELD OF THE INVENTION

The invention relates to a communication network, and in particular relates to a communication network that comprises a plurality of femtocell base stations.

BACKGROUND OF THE INVENTION

In an Evolved Universal Terrestrial Radio Access Network (E-UTRAN), a user equipment (UE) accesses the radio network through an enhanced Node B (eNB). The eNB initiates connections on the air interface, assigns air-interface resources and performs scheduling. The eNBs are connected to a core network via an interface known as S1. The eNBs are also interconnected through an interface known as X2, which allows the eNBs to initiate and complete actions, such as handovers, without having to use higher network authorities to co-ordinate the action.

Femtocells (or "Home" or "Enterprise" eNBs) are small, low-power, indoor cellular base stations for residential or business use. They provide better network coverage and capacity than that available in such environments from the overlying macrocellular network (i.e. the eNBs). In addition, Home or Enterprise eNBs use a broadband connection to receive data from and send data back to the operator's network (known as "backhaul").

The Home or Enterprise eNB acts as an extension to the existing macro cellular network and provides enhanced network coverage and capacity for all users in range of the Home or Enterprise eNB. In a residential context, this means that the Home eNB will provide access to the network for those resident in that location, as well as for neighbours and passers-by if the macrocellular coverage is poor and if the Home eNB is configured to have "open" access. Any interference between transmissions from the Home eNB and the overlying macrocellular network is mitigated by the ability for user equipments (UEs) to handoff between the Home eNB and the macrocellular network.

It has been suggested that due to the nature of these Home or Enterprise eNBs, there is no need for X2 interfaces to be established between neighbouring Home or Enterprise eNBs or between Home or Enterprise eNBs and the macro eNBs for handover signalling. One reason for this is that if X2 interfaces were provided between neighbouring Home or Enterprise eNBs and between Home or Enterprise eNBs and macro eNBs, then a large deployment of Home or Enterprise eNBs (as is envisaged) would result in a very large number of X2 interfaces to be managed by each Home or Enterprise eNB and particularly by each macro eNB. In addition, due to the nature of the Home or Enterprise eNBs, the population of Home or Enterprise eNBs within a macro eNB can change frequently as Home or Enterprise eNBs are activated and deactivated, so the macro eNBs will often need to reconfigure their connections. This would lead to significant complexity in the macro eNB.

However, there are benefits to having an X2 interface available to Home or Enterprise eNBs. These benefits include the ability to perform faster handovers between the femto and macro layers, the ability to wake Home or Enterprise eNBs when user equipments (UEs) which are registered to use the Home or Enterprise eNB arrive in its vicinity, and the ability to provide interference control between Home eNBs and macro eNBs, and also between neighbouring Home eNBs. In particular, a Home or Enterprise eNB can be provided with an indication of the loading and usage of the macro uplink, which is not available by other means.

Therefore, it has been proposed that X2 interfaces between neighbouring Home or Enterprise eNBs and between Home or Enterprise eNBs and the macro eNBs can be provided using a proxy function that operates between the Home or Enterprise eNBs and macro eNBs. An exemplary system is shown in FIG. 1. Thus, the X2 proxy is connected to each of its Home eNBs through one X2 interface for each Home eNB, and it is connected to each of the macro eNBs that manage cells that overlap one or more of the Home eNBs managed by the X2 proxy by respective X2 interfaces.

According to this proposal, for the direction Home eNB to macro eNB, the X2 proxy performs an "aggregation" function to provide the macro eNB with a complete picture of the Home eNB layer loading. The macro eNB is then expected to take account of the Home eNB layer loading, which adds complexity to the macro eNBs. In addition, there is questionable benefit in providing the macro eNBs with an aggregated X2, given that the various Home eNBs will be experiencing different loading conditions and will have different path loss/shadowing to the particular macro eNBs, which leads to different interference susceptibility between the Home eNBs and macro eNBs.

Therefore, it is an object of the invention to provide an alternative solution for providing an X2 interface between neighbouring Home or Enterprise eNBs and between Home or Enterprise eNBs and macro eNBs.

SUMMARY OF THE INVENTION

There is therefore provided a method of operating a communication network comprising at least one macrocellular base station, and a plurality of femtocell base stations that are within the coverage area of the at least one macrocellular base station, the method comprising providing a proxy in a signalling path between the at least one macrocellular base station and the plurality of femtocell base stations, providing unidirectional signalling for the support of mobility and interference control from the at least one macrocellular base station to the proxy; and providing signalling for the support of mobility and interference control between the proxy and the plurality of femtocell base stations.

According to a second aspect of the invention, there is provided a node for use in a communication network comprising at least one macrocellular base station, and a plurality of femtocell base stations that are within the coverage area of the at least one macrocellular base station, the node being adapted to act as a proxy in a signalling path between the at least one macrocellular base station and the plurality of femtocell base stations, receive unidirectional signalling for the support of mobility and interference control from the at least one macrocellular base station; and provide signalling for the support of mobility and interference control to the plurality of femtocell base stations.

According to a third aspect of the invention, there is provided a femtocell base station for use in a communication network comprising at least one macrocellular base station and a proxy, the femtocell base station being suitable for use within the coverage area of the at least one macrocellular base station, the femtocell base station being adapted to receive unidirectional signalling for the support of mobility and interference control from the at least one macrocellular base station via the proxy.

According to a fourth aspect of the invention, there is provided a method of operating an Evolved Universal Terrestrial Radio Access Network comprising at least one macro enhanced Node B, and a plurality of Home or Enterprise enhanced Node Bs that are within the coverage area of the at least one macro enhanced Node B, the method comprising providing a proxy in a signalling path between the at least one macro enhanced Node B and the plurality of Home or Enterprise enhanced Node Bs, providing unidirectional X2 signalling from the at least one macro enhanced Node B to the proxy; and providing X2 signalling between the proxy and the plurality of Home or Enterprise enhanced Node Bs.

BRIEF DESCRIPTION OF THE DRAWINGS

Various embodiments of the invention will now be described, by way of example only, with reference to the following drawings, in which.

DETAILED DESCRIPTION OF THE PREFERRED EMBODIMENTS

Although the invention will be described below with reference to an Evolved Universal Terrestrial Radio Access Network (E-UTRAN) and Home eNBs, it will be appreciated that the invention is applicable to other types of third or subsequent generation network in which a large number of femtocell base stations (whether for home or business use) can be deployed. Furthermore, although the invention will be described with reference to the X2 signalling and interface, it will be appreciated that the invention can be applied to any interface that provides signalling for the support of mobility and interference control.

Figure 1:
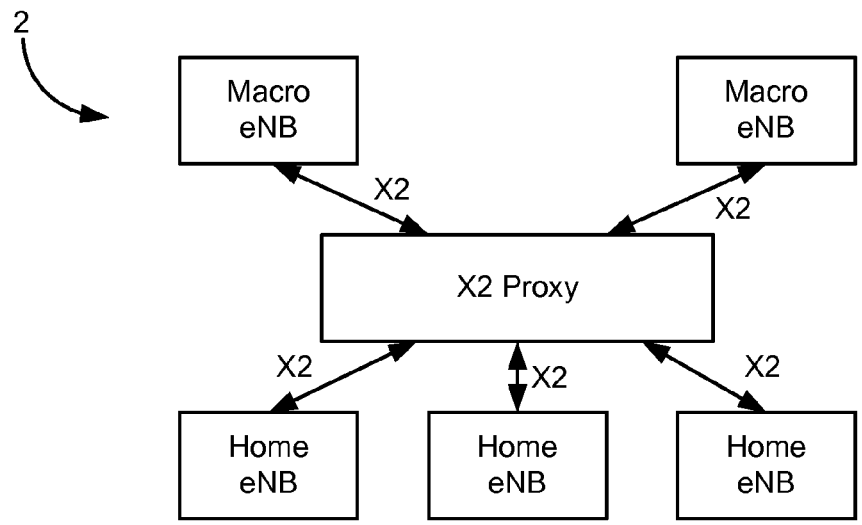
FIG. 1 shows a conventional system in which an X2 proxy is provided between Home eNBs and one or more macro eNBs.
Figure 2:
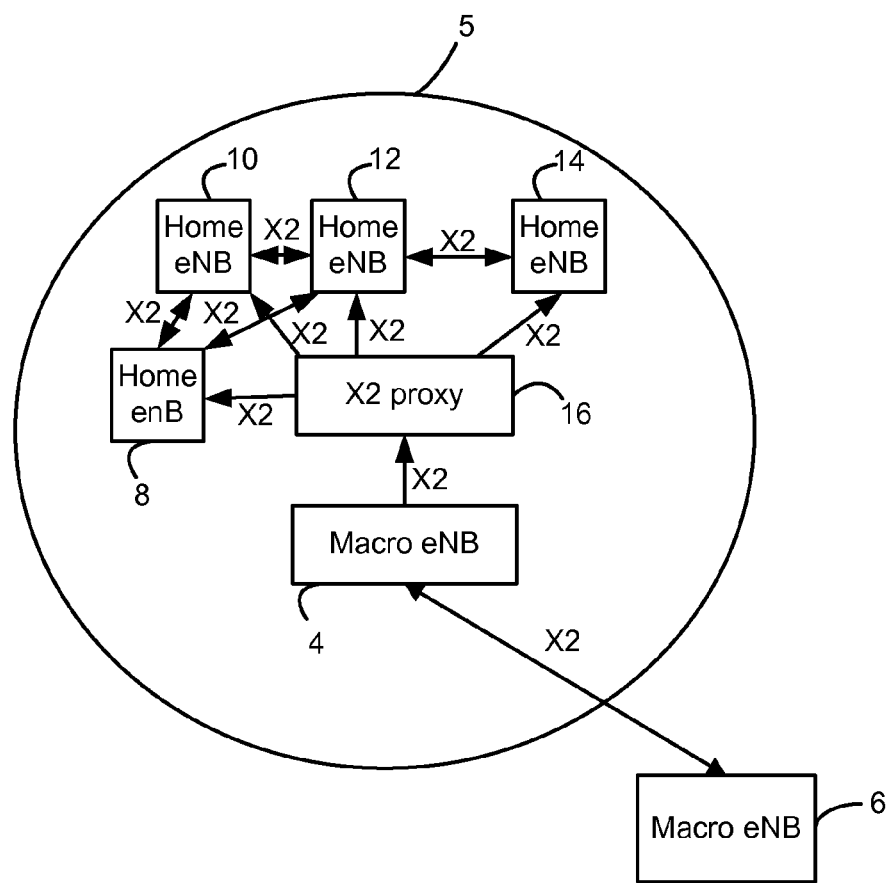
FIG. 2 shows a system in which an X2 proxy is provided between Home eNBs and one or more macro eNBs in accordance with a first embodiment of the invention.

FIG. 2 shows a first embodiment of an Evolved Universal Terrestrial Radio Access Network (E-UTRAN) 2 in accordance with the invention. The E-UTRAN 2 comprises a first macro enhanced Node B (eNB) 4 that has a cell coverage area outlined by circle 5 and a second macro eNB 6 whose coverage area is not shown.

In this illustrated embodiment, within the cell coverage 5 of the first macro eNB 4, there are four Home enhanced Node Bs (eNBs) 8, 10, 12 and 14. Each of the Home eNBs 8, 10, 12 and 14 has a respective cell coverage area (not shown), but it will be appreciated that, due to the nature of the Home eNBs, this coverage area is substantially less than the coverage area 5 of the first macro eNB 4.

As described above, X2 interfaces between devices are desirable for handover operations and interference management in the E-UTRAN 2. However, it is not desirable for there to be X2 interfaces between each of the Home eNBs 8, 10, 12 and 14 and the first macro eNB 4.

Therefore, in accordance with the invention, an X2 proxy 16 is provided in a signalling path between the first macro eNB 4 and the Home eNBs 8, 10, 12 and 14. The first macro eNB 4 provides a single X2 interface to the X2 proxy 16 which broadcasts the X2 interface to each of the Home eNBs 8, 10, 12 and 14. Thus, the X2 signalling between the first macro eNB 4 and the X2 proxy 16 is unidirectional.

In this illustrated embodiment, the X2 signalling from the X2 proxy 16 to the respective Home eNBs 8, 10, 12 and 14 is also unidirectional. However, each of the Home eNBs 8, 10, 12 and 14 have bidirectional signalling over an X2 interface with each of the other Home eNBs that are neighbouring Home eNBs (i.e. they are within each others coverage area). Thus, as shown in FIG. 2, each of Home eNBs 8, 10 and 12 have bidirectional signalling over an X2 interface with each other, while Home eNB 14 only has bidirectional signalling over an X2 interface with Home eNB 12.

Bidirectional signalling over an X2 interface can also be provided between neighbouring macro eNBs, such as the first macro eNB 4 and the second macro eNB 6, and this X2 interface can operate normally.

Therefore, this arrangement of the E-UTRAN 2 means that the complexity of the macro eNBs is minimised and their performance is not constrained as the macro eNBs only need to consider their impact to neighbouring macro eNBs, and not to Home eNBs that may be within their coverage area. In addition, the macro eNBs are not responsible for discovering the presence of Home eNBs.

The Home eNBs do need to consider their impact on any neighbouring Home eNBs, and on the macro eNBs.

It will be appreciated from the above that FIG. 2 illustrates logical flows of information between the macro eNBs and Home eNBs and not their "physical" connections. In particular, it will be appreciated that the Home eNBs are likely to be connected via a broadband Internet connection (or similar) to an Internet Service Provider (ISP), and from the ISP to the core network of the E-UTRAN. Therefore, the X2 interfaces between the Home eNBs and between the Home eNBs and X2 proxy will be established through these Internet connections.

When a Home eNB 8, 10, 12 or 14 is initialised, and periodically thereafter, the Home eNB scans the downlink band (either via a sniffer function built in to the Home eNB or by making use of measurements from a UE local to the Home eNB) to find its macro eNB 4 and its Home eNB neighbours. In addition, the Home eNB can request the X2 proxy 16 to provide X2 interface information from or to any newly discovered neighbours as appropriate (depending on whether the neighbour is a macro eNB or a Home eNB—so in this embodiment, only for macro eNBs).

If there is no X2 connection already existing between the X2 proxy 16 and the identified neighbour(s), then the X2 proxy 16 initiates a setup of an X2 interface between itself and these neighbours. The appropriate X2 interface information is then exchanged between the X2 proxy 16 and the requesting Home eNB.

The exchange of X2 information between a Home eNB 8, 10, 12 or 14 and the X2 proxy 16 would be terminated for any neighbours that another Home eNB 8, 10, 12 or 14 no longer detects.

The exchange of X2 information between a Home eNB 8, 10, 12 or 14 and the X2 proxy 16 would also be terminated if the Home eNB becomes inactive (i.e. turned off).

The transfer of X2 information to the X2 proxy 16 from the first macro eNB 4 could continue for a configurable time out period in the case that no Home eNB is requesting X2 information from the first macro eNB 4. This would help to minimise the time required to provide X2 information to Home eNBs that are switched on after being temporarily turned off.

In this way, the Home eNBs can take account of loading and interference conditions in the small number of neighbouring Home and macro eNBs. However the macro eNB does not need to know anything, or do anything, about the potentially large set of Home eNBs in its vicinity, thus simplifying the macro eNB. Furthermore, the X2 proxy 16 does not need to perform the above mentioned aggregation function of the multiple Home eNBs, thus simplifying the proxy function.

It will be appreciated that in this embodiment, the Home eNBs 8, 10, 12 and 14 do not have an "uplink" X2 connection to the X2 proxy 16 that allows them to request the X2 proxy 16 to provide the information indicated above. In this case, or indeed all cases, the Home eNBs can communicate with the X2 proxy 16 using an alternative control interface (for example the S1 interface) to request setup or termination of X2 information exchange with the macro eNB 4. Each Home eNB 8, 10, 12 and 14 may already have an S1 interface to the core network.

The Home eNBs can detect a neighbouring macro eNB from measurements made of the radio environment and can use the control interface to request the X2 proxy 16 provide X2 signalling from the detected macro eNB.

If the Home eNB can no longer detect one of its neighbouring Home eNBs (for example if the Home eNB has become inactive), the Home eNB can use the control interface to request termination of the X2 signalling with the neighbouring Home eNB.

The control interface can also be used by the X2 proxy 16 to request a macro eNB provide X2 signalling.

In particular, there may be a gateway or other network node present which provides a concentration function in order to connect a large number of Home eNBs to the core network. Therefore, in this embodiment, the X2 proxy 16 can preferably be co-located with this gateway function. In this case, control signalling for requesting the setup or termination of X2 information exchange could be carried on the same interface as the control signalling between the gateway and Home eNBs that is used for other purposes such as registration, authentication etc.

Figure 3:
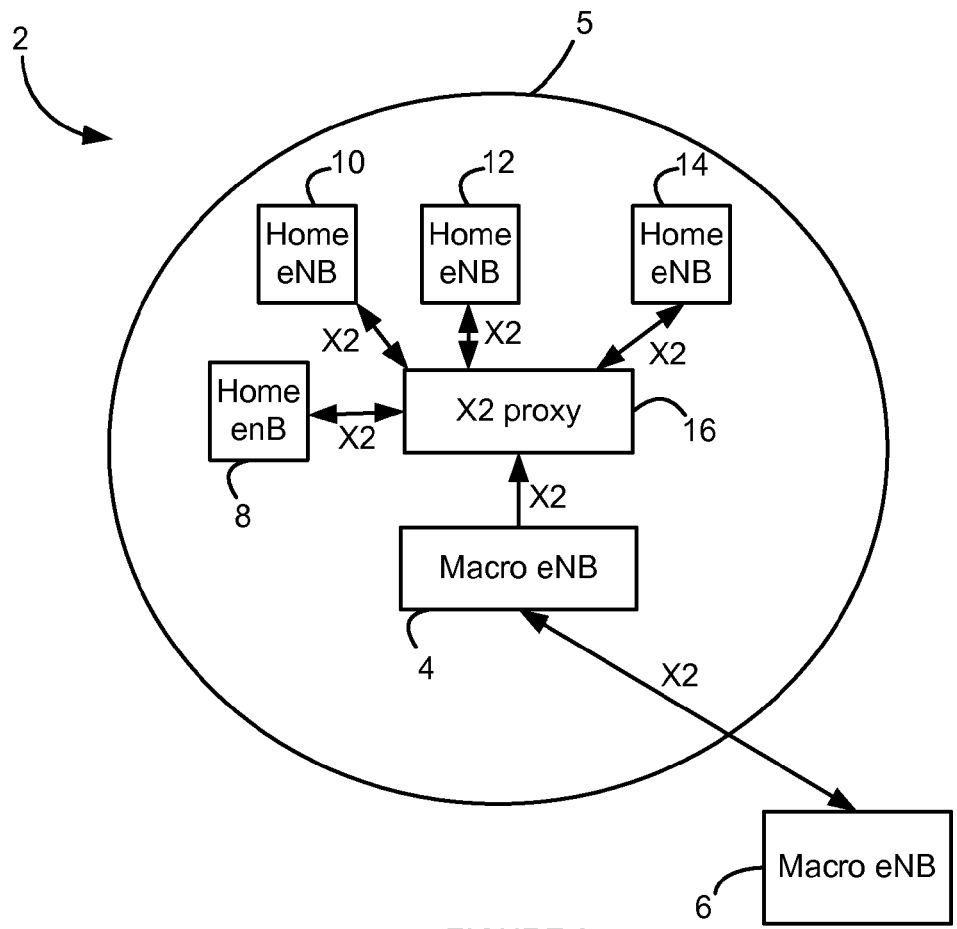
FIG. 3 shows a system in which an X2 proxy is provided between Home eNBs and one or more macro eNBs in accordance with a second embodiment of the invention.

FIG. 3 shows an alternative E-UTRAN 2 in accordance with a second embodiment of the invention. In this Figure, elements that are common with the first embodiment shown in FIG. 2 are given the same reference numerals. Again, the first macro eNB 4 provides a single X2 interface to the X2 proxy 16 which broadcasts the X2 interface to each of the Home eNBs 8, 10, 12 and 14. Thus, the X2 signalling between the first macro eNB 4 and the X2 proxy 16 is unidirectional.

However, in this embodiment, X2 signalling from the X2 proxy 16 to the respective Home eNBs 8, 10, 12 and 14 is bidirectional. Thus, each of the Home eNBs 8, 10, 12 and 14 has bidirectional signalling over a respective X2 interface with the X2 proxy 16, and this signalling replaces the X2 interfaces between each of the Home eNBs 8, 10, 12 and 14. In this embodiment, the Home eNB can also detect a neighbouring Home eNB from measurements made of the radio environment and can use the control interface to request the X2 proxy 16 provide X2 signalling from the detected Home eNB. In common with the first embodiment, the control signalling for the setup and release of X2 information flows can be carried on a control interface (for example S1) defined between the Home eNB and the gateway in the core network.

Figure 4:
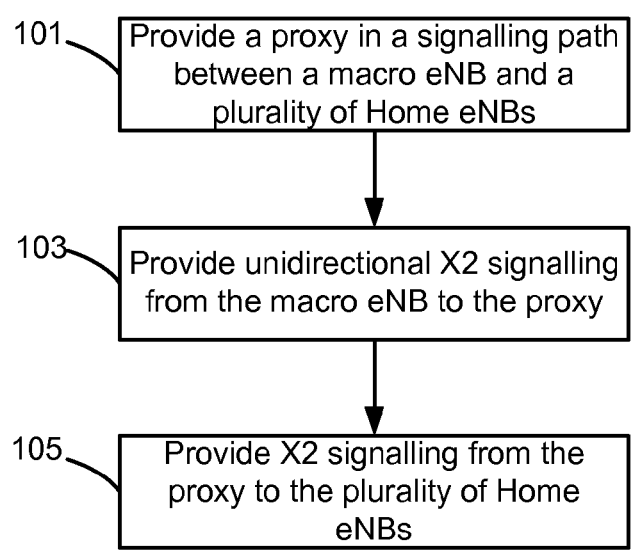
FIG. 4 shows a method of operating a E-UTRAN in accordance with the invention.

FIG. 4 shows a method of operating a E-UTRAN in accordance with the invention. In step 101, a proxy is provided in a signalling path between at least one macro eNB and a plurality of Home eNBs. In step 103, unidirectional X2 signalling is provided from the macro eNB to the proxy. In step 105, X2 signalling is provided from the X2 proxy to the plurality of Home eNBs.

As described above, in some embodiments, the X2 signalling from the X2 proxy to the plurality of Home eNBs is unidirectional, and the method further comprises providing bidirectional signalling between each of the Home eNBs.

However, in alternative embodiments, the X2 signalling from the X2 proxy to the plurality of Home eNBs can be bidirectional, which means that the X2 proxy acts as an intermediary for the X2 signalling between the Home eNBs.

There is therefore provided a method of operating a E-UTRAN to provide an X2 interface between neighbouring Home eNBs and between Home eNBs and macro eNBs.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operating a communication network comprising at least one macrocellular base station, and a plurality of femtocell base stations that are within the coverage area of the at least one macrocellular base station, the method comprising:

providing a proxy in a signaling path between the at least one macrocellular base station and the plurality of femtocell base stations;

providing unidirectional signaling for the support of mobility and interference control from the at least one macrocellular base station to the proxy; and providing signaling for the support of mobility and interference control between the proxy and the plurality of femtocell base stations, which includes unidirectional signaling from the proxy to the plurality of femtocell base stations.

2. A method as claimed in claim 1, further comprising the step of: providing bidirectional signaling for the support of mobility and interference control between the plurality of femtocell base stations.

3. A method as claimed in claim 2, wherein each of the plurality of femtocell base stations provides a respective coverage area, and the step of providing bidirectional signaling for the support of mobility and interference control between the plurality of femtocell base stations comprises providing signaling for the support of mobility and interference control between each femtocell base station and other femtocell base stations that are in range of said femtocell base station.

4. A method as claimed in claim 1, further comprising the step of: providing a control interface from each of the plurality of femtocell base stations to a core network or femtocell base station gateway, the control interface to the core network or femtocell base station gateway configured to be used by the femtocell base station to provide signaling for the support of mobility and interference control to the proxy.

5. A method as claimed in claim 1, wherein the step of providing signaling for the support of mobility and interference control between the proxy and the plurality of femtocell base stations comprises providing bidirectional signaling for the support of mobility and interference control between the proxy and each of the plurality of femtocell base stations.

6. A method as claimed in claim 4, further comprising the steps, by a femtocell base station, of: detecting a neighboring macrocellular base station from measurements made of the radio environment; and using the control interface to request the proxy provide signaling for the support of mobility and interference control from the detected macrocellular base station.

7. A method as claimed in claim 4, further comprising the steps, by a femtocell base station, of: detecting a neighboring femtocell base station from measurements made of the radio environment; and using the control interface to request the proxy provide signaling for the support of mobility and interference control from the detected femtocell base station.

8. A method as claimed in claim 7, further comprising the step, by a first femtocell base station, of: requesting that the signaling for the support of mobility and interference control from the detected femtocell base station is terminated in the event that the detected femtocell base station is no longer detected or if the first or detected femtocell base station becomes inactive.

9. A method as claimed in claim 1, further comprising the step, by the proxy, of: requesting a macrocellular base station provide signaling for the support of mobility and interference control to the proxy.

10. A method as claimed in claim 1, wherein the communication network is an Evolved Universal Terrestrial Radio Access Network, the femtocell base stations are Home or Enterprise enhanced Node Bs and the signaling for the support of mobility and interference control is X2 signaling.

11. A node for use in a communication network comprising at least one macrocellular base station, and a plurality of femtocell base stations that are within the coverage area of the at least one macrocellular base station, the node configured to:
   act as a proxy in a signaling path between the at least one macrocellular base station and the plurality of femtocell base stations,
   receive unidirectional signaling for the support of mobility and interference control from the at least one macrocellular base station; and
   provide unidirectional signaling for the support of mobility and interference control to the plurality of femtocell base stations.

12. A node as claimed in claim 11, further configured to receive signaling control information from the plurality of femtocell base stations via a separate control interface.

13. A node as claimed in claim 12, wherein the separate control interface is an S1 interface.

14. A node as claimed in claim 11, that is configured to provide bidirectional signaling for the support of mobility and interference control to the plurality of femtocell base stations.

15. A node as claimed in claim 11, wherein the node is for use in an Evolved Universal Terrestrial Radio Access Network and the signaling for the support of mobility and interference control is X2 signaling.

16. A femtocell base station for use in a communication network comprising at least one macrocellular base station and a proxy, the femtocell base station configured to be suitable for use within the coverage area of the at least one macrocellular base station, the femtocell base station configured to:
   act as a proxy in a signaling path between the at least one macrocellular base station and a node;
   receive unidirectional signaling for the support of mobility and interference control from the at least one macrocellular base station via the proxy;
   provide unidirectional signaling for the support of mobility and interference control for other femtocell base stations, which includes unidirectional signaling from the node to the femtocell base station.

17. A femtocell base station as claimed in claim 16, wherein the femtocell base station has a coverage area and is further configured to establish bidirectional signaling for the support of mobility and interference control with any other femtocell base stations within the coverage area.

18. A femtocell base station as claimed in claim 16, further configured to provide signaling for the support of mobility and interference control to the proxy via a separate control interface.

19. A femtocell base station as claimed in claim 18, wherein the separate control interface is an S1 interface.

20. A femtocell base station as claimed in claim 16, wherein the femtocell base station is for use in an Evolved Universal Terrestrial Radio Access Network and the signaling for the support of mobility and interference control is X2 signaling.

21. A femtocell base station for use in a communication network comprising at least one macrocellular base station and a proxy, the femtocell base station being suitable for use within the coverage area of the at least one macrocellular base station, the femtocell base station having a respective coverage area, the femtocell base station being adapted to:
   communicate with a proxy, the proxy located in a signaling path between the at least one macrocellular base station and the femtocell base station;
   establish a unidirectional signalling interface with the proxy for receiving unidirectional signalling for the support of mobility and interference control from the at least one macrocellular base station via the proxy; and
   to establish unidirectional signalling for the support of mobility and interference control with any other proxy within the coverage area of the femtocell base station to establish unidirectional signalling from the proxy to the femtocell base station.

* * * * *